United States Patent

Yanai

[11] Patent Number: 5,232,410
[45] Date of Patent: Aug. 3, 1993

[54] ROTATIONAL SPEED DIFFERENTIAL RESPONSIVE TYPE CONTROL COUPLING

[75] Inventor: Tokiyoshi Yanai, Kanagawa, Japan

[73] Assignee: Nissan Motor Co., Ltd., Yokohama, Japan

[21] Appl. No.: 861,740

[22] Filed: Apr. 1, 1992

[30] Foreign Application Priority Data

Apr. 1, 1991 [JP] Japan ................................ 3-068385

[51] Int. Cl.⁵ .............................................. F16D 31/02
[52] U.S. Cl. ........................................ 475/84; 475/231;
60/403; 60/468; 60/494; 91/6.5; 91/474;
91/449; 92/158; 92/159
[58] Field of Search ................ 475/84, 231, 249;
60/403, 468, 494; 91/6.5, 474, 449; 92/158, 159

[56] References Cited

U.S. PATENT DOCUMENTS 4,212,230  7/1980  Eickmann ..................... 92/159 X
4,244,279  1/1981  Stewart et al. ................ 92/158 X
4,932,510  6/1990  Takemura et al. ............. 475/84 X Primary Examiner—Allan D. Herrmann
Assistant Examiner—William O. Trousdell
Attorney, Agent, or Firm—Lowe, Price, LeBlanc & Becker

[57] ABSTRACT

A pair of orifices of different orifice sizes is provided between each pressure chamber and an accumulator chamber. A larger one serves as a variable orifice and a smaller one as a fixed orifice. The variable orifice becomes effective when a control circuit is functioning properly for variably controlling an axial position of a valve spool. The fixed orifice becomes effective when the control circuit malfunctions and allows the valve spool to be moved into a predetermined position. In another embodiment, a single orifice cooperates with the valve spool to serve as both a variable orifice and a fixed orifice.

14 Claims, 6 Drawing Sheets (VARIABLE ORIFICE)

(FIXED ORIFICE)

ROTATIONAL SPEED DIFFERENTIAL RESPONSIVE TYPE CONTROL COUPLING

BACKGROUND OF THE INVENTION

1. Field of the Invention

The present invention relates to a rotational speed differential responsive type control coupling, particularly of the kind having a variable transfer torque control means, i.e., a means for variably controlling a transfer torque for a given rotational speed differential.

2. Description of the Prior Art

An example of such a control coupling is disclosed in European Patent Publication No. 0,398,124. In such a control coupling, a stepping motor is utilized for variably controlling the axial position of a valve spool for thereby controlling the torque transfer characteristic through control of the size of the variable orifice.

However, if a control circuit of such a stepping motor malfunctions, the valve spool is moved under the pressure of the hydraulic fluid in the accumulator chamber until it abuts upon the stopper and fully opens the orifice. By this, the control coupling is disabled to perform a torque distribution function or a differential slip limiting function.

SUMMARY OF THE INVENTION

In accordance with the present invention, there is provided a novel and improved control coupling which comprises a first rotary member, a second rotary member, hydraulic fluid discharge means responsive to a rotational speed differential between the first and second rotary members for discharging a quantity of hydraulic fluid proportional to the rotational speed differential, orifice means for restricting discharge of hydraulic fluid by the discharge means and thereby producing a transfer torque between the first and second rotary members, orifice opening changing means operatively connected to the orifice means for changing an orifice size of the orifice means, the orifice opening changing means including a valve spool axially movable for varying an orifice size of the orifice means when actuated and actuator means for actuating the valve spool, and control circuit means for controlling an operation of the actuator means, the valve spool being movable between first and second axial positions in the event of the control circuit means functioning properly and into a third axial position which is outside a range between the first and second positions to be held stationarily thereat in the event of malfunction of the control circuit means, in which the orifice means cooperates with the valve spool to constitute variable orifice means when the valve spool is between the first and second axial positions and fixed orifice means when the valve spool is in the third axial position.

The above structure is effective for solving the above noted problem inherent in the prior art device.

It is accordingly an object of the present invention to provide a novel and improved rotational speed differential responsive type control coupling which can retain a suitable torque transfer characteristic even in the event of malfunction of a control circuit.

It is a further object of the present invention to provide a novel and improved control coupling of the above described character which is desirable from the safety driving point of view.

BRIEF DESCRIPTION OF THE DRAWINGS

FIG. 6b is a side view of the piston of FIG. 6a;

FIG. 6c a sectional view taken along line 6c–6c of FIG. 6a;

FIG. 7b is a sectional view taken along line 7b—7b of FIG. 7a;

DESCRIPTION OF THE PREFERRED EMBODIMENTS

Figure 4:
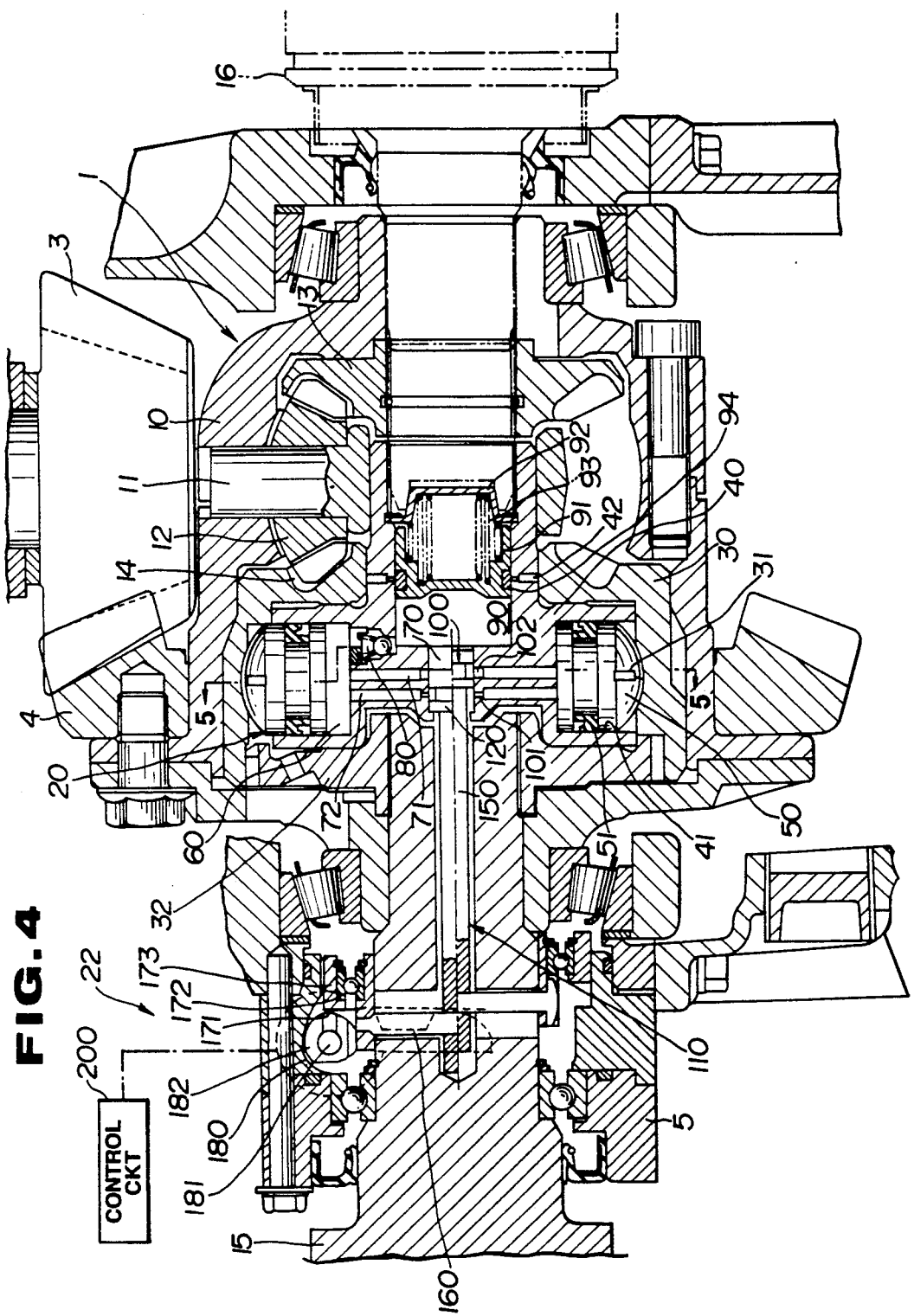
FIG. 4 is a sectional view of a limited slip rear differential in which a rotational speed differential responsive type control coupling according to an embodiment of the present invention is incorporated to serve as a differential slip limiting device.
Figure 5:
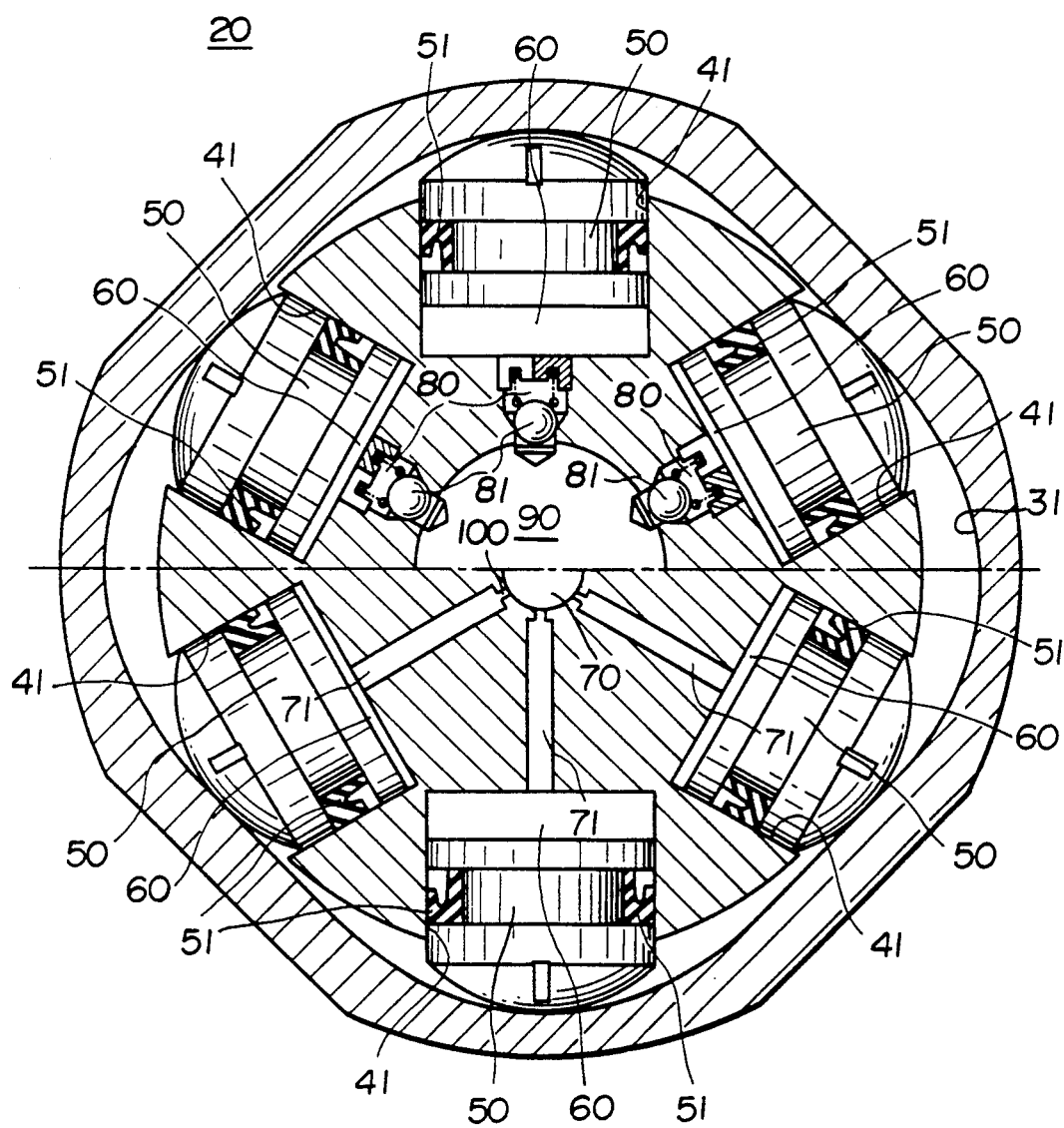
FIG. 5 is an enlarged sectional view taken along line 5—5 of FIG. 4.

Referring first to FIGS. 4 and 5, a rotational speed differential responsive type control coupling is generally indicated by 20 and by way of example incorporated in a limited slip rear differential 1 to serve as a slip limiting device.

The rear differential 1 includes a driving member in the form of a differential casing 10 which is rotatable about an axis, and two driven members in the form of axle shafts 15 and 16 extending in the opposite outward directions from the casing 10 generally along the axis which the casing 10 is rotatable about. An input gear 3 meshes with a ring gear 4 which is bolted to the casing 10. A pinion carrier 11 is mounted in the casing 10 for rotation therewith and rotatably carries a pinion 12. A pair of side gears 13 and 14 are drivingly connected to the axle shafts 15 and 16, respectively.

The rotational speed differential responsive type control coupling 20 is disposed between the axle shafts 15 and 16 to limit a rotational speed differential therebetween. The control coupling 20 comprises a first rotary element in the form of a cam ring 30 formed with a rise and fall cam surface 31. The cam ring 30 is splined to a hub 32 which is in turn splined to the axle shaft 15. Surrounded by the cam ring 30 is a second rotary element in the form of a rotor 40. The rotor 40 is drivingly connected to the axle shaft 16 and therefore to the side gear 13 to rotate with them, i.e., the axle shaft 16 is splined to the side gear 13 and extends further inward of the casing 10 into a central opening of the carrier 11 and is splined to the rotor 40. By this, an input torque transmitted to the differential casing 10 via the input gear 3 and the ring gear 4 is transmitted on one hand to the axle shaft 16 via the pinion 12 and the side gear 13, and on the other hand to the axle shaft 15 via the pinion 12, side gear 14, cam ring 30 and splined hub 32.

When a rotational speed differential occurs between the axle shafts 15 and 16, a torque for limiting a differential slip, i.e., a transfer torque is produced by a hydraulic fluid discharge means which will be described hereinbelow.

The hydraulic fluid discharge means includes the rise and fall cam surface 31, six cylinders 41 formed in the rotor 40 (see FIG. 5), and six pistons 50 positioned in the respective cylinders 41. Each piston 50 has a seal ring 51 to define a pressure chamber 60. More specifically, the cylinders 41 are in the form of radial holes having open radially outward ends where they face the cam surface 31.

Figure 6A:
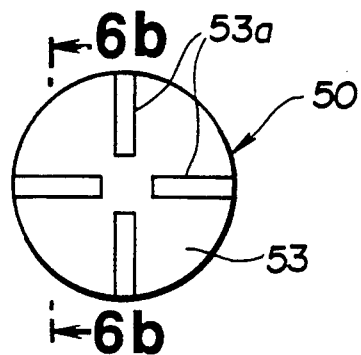
FIG. 6a is a plan view of a piston utilized in the control coupling of FIG. 4.
Figure 6B:
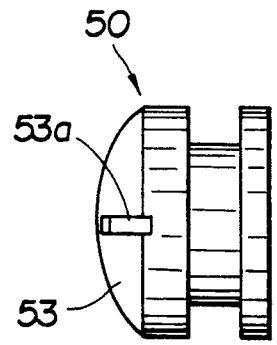
Figure 6C:
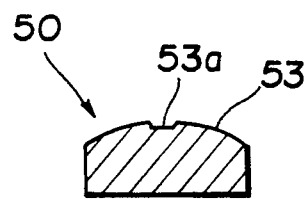
Figure 7A:
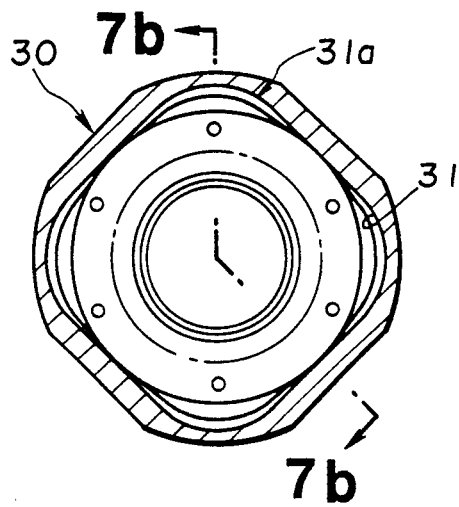
FIG. 7a is a cam ring utilized in the control coupling of FIG. 4.
Figure 7B:
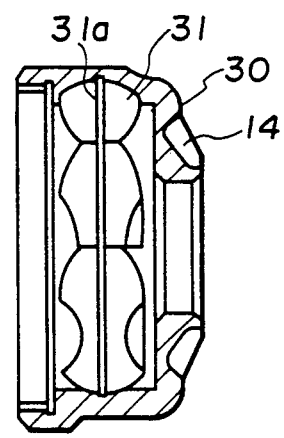

As shown in FIGS. 6a to 6c, each piston 50 has a part-spherical top 53 for contact with the cam surface 31 and a plurality of grooves 53a formed in the top 53. The grooves 53a are provided with a view to improving the lubrication property and wear resistance and thereby enabling a larger torque transfer. In this connection, the grooves 53a are not formed in the central portion or apex portion of the part-spherical top 53 so as not to cause any influence on the movements of the pistons 50 radially of the rotor 40 when the pistons 50 go over a smallest diameter portion of the cam surface 31, i.e., when the pistons 50 are driven by the cam surface 31 so as to be positioned most inward of the rotor 40. As shown in FIGS. 7a and 7b, the grooves 53a of the pistons 50 may be replaced by a groove 31a formed in the cam surface 31 of the cam ring 30 at an axially central portion thereof for attaining the same effect.

The hydraulic fluid discharge means further includes a discharge passage means for discharging hydraulic fluid from the pressure chambers 60. As best seen from FIG. 5, the discharge passage means includes six radial discharge passages 71 formed in the rotor 40 to extend between the respective pressure chambers 60 and a spool chamber 70 for providing communication therebetween. The discharge passage means further includes six radial passages 72 which are respectively formed into pairs with the discharge passages 71 for providing communication between the chambers 60 and the spool chamber 70. The spool chamber 70 is in turn communicated with an accumulator chamber 90.

A restriction or orifice means 100 is provided at the junction between the respective discharge passages 71 and 72 and the spool chamber 70 for restricting fluid flow therethrough and thereby producing a transfer torque for limiting a differential slip in response to a rotational speed differential between the axle shafts 15 and 16.

The orifice means 100 includes two kinds of orifices 101 and 102 which are different in size. The orifices 101 are smaller in size than the orifices 102 and disposed at the junction between the discharge passages 72 and the spool chamber 70, respectively. The orifices 102 are disposed at the junction between the discharge passages 71 and the spool chamber 70, respectively. As will be understood when the description proceeds further, the orifices 102 of a larger size cooperate with a valve spool 120 to constitute a variable orifice means, while the orifices 101 of a smaller size serve as a fixed orifice means to be opened and closed by the valve spool 120.

Each pressure chamber 60 is communicated with a ball check valve 81 having a radial passage 80 extending between the respective pressure chambers 60 and the accumulator chamber 90 to provide communication therebetween. With these ball check valves 81, discharge of hydraulic fluid from the pressure chamber 60 is prevented although supply of hydraulic fluid thereto is allowed. The ball check valves 81 thus constitute a regulator passage means for regulating the pressure within the pressure chambers 60.

The accumulator chamber 90 and the spool chamber 70 are formed from a central or concentric opening of the rotor 40, which concentric opening has opposite axial ends sealingly closed by the valve spool 120 and an accumulator piston 91, respectively. The accumulator piston 91 is slidably installed in the accumulator chamber 90 and has a seal ring 94. The rotor 40 is formed with radial relief passages 42 which cooperate with the seal ring 94 to constitute a relief valve for maintaining the fluid pressure within the accumulator chamber 90 below a predetermined value. The accumulator piston 91 is biased toward the valve spool 120 by an accumulator spring 93 in the form of a dual spring assembly for thereby maintaining the fluid pressure within the accumulator chamber 90 above a predetermined value. The accumulator spring 93 is operatively disposed between the accumulator piston 91 and a spring retainer 92 fixed to the rotor 30.

The control coupling 20 is provided with a transfer torque control device 22 for variably controlling the torque transfer characteristic.

The transfer torque control device 22 includes the valve spool 120 axially movably installed in the spool chamber 70 and cooperating with the orifices 102 of a larger size to constitute the variable orifice means. The valve spool 120 also serves as a valve means for controlling opening and closing of the orifices 101 of a smaller size which constitute the fixed orifice means.

More specifically, the valve spool 120 is formed with a circumferential groove 120a extending throughout the circumference thereof and an opening 120b for communicating the circumferential groove 120a with the accumulator 90. The valve spool 120 has on one axial side of the circumferential groove 120a opposite to the accumulator chamber 90 a seal groove 120c in which an O-ring 121 is installed. The width of the groove 120a is substantially the same to the width of each orifice 102 with respect to the axial direction of the spool 120. The distance between each pair of orifices 101 and 102 with respect to the axial direction of the valve spool 120 is set to be a little larger than the width of the circumferential groove 102a. The rotor 40 is provided with a stopper 43 which is arranged so that when the valve spool 120 is in the position of abutting upon the stopper 43 the groove 120a is communicated with only the orifices 101 of a smaller size.

The transfer torque control device 22 further includes an orifice opening changing means 110 for changing the opening of the orifice means 100 through variation of the axial position of the valve spool 120. The orifice opening changing means 110 includes a stepping motor or an electrical type motor 180 installed in a differential housing 5 and having a motor shaft 181, a fork or lever 182 secured to the motor shaft 181 to turn therewith, concentric inner and outer sleeves 171 and 173 axially movably installed on the axle shaft 15, a ball bearing 172 interposed between the inner and outer sleeves 171 and 173 to support them upon each other, the outer sleeve 173 being held in contact with a free end of the lever 182, a transversal rod 160 extending through and transversely of the axle shaft 15 to have opposite axial ends secured to the inner sleeve 171 and movable axially of the axle shaft 15 together with the inner sleeve 171, and a push rod 150 concentrically and axially movably installed in the axle shaft 15 and secured to an axially central portion of the transversal rod 160 at an axial portion adjacent to an end.

The valve spool 120 is held in contact with the push rod 150 under the pressure of the hydraulic fluid within the accumulator chamber 90. By the pressure of the hydraulic fluid within the accumulator chamber 90, the valve spool 120 and the push rod 150 are urged together in a predetermined direction to cause the outer sleeve 173 to be held in contact with the lever 182. By this, the valve spool 120 is driven by the stepping motor 180 to move axially relative to the rotor 40 for thereby changing the opening or size of the orifice means 100.

The lever 182 is preferably structured in accordance with the fork shown in the aforementioned European patent publication No. 0,398,124, i.e., the lever 182 is generally semicircular in shape and placed to straddle the axle shaft 15.

The transfer torque control device 22 further includes a control circuit 200 for controlling the operation of the stepping motor 180. The control circuit 200 may be structured in accordance with the control circuit as shown in U.S. Ser. No. 719,704 filed Jun. 29, 1990, in the name of Akihito SANO et al. and assigned to the assignee of this application.

The operation of the control coupling 20 will now be described hereinbelow.

Figure 1:
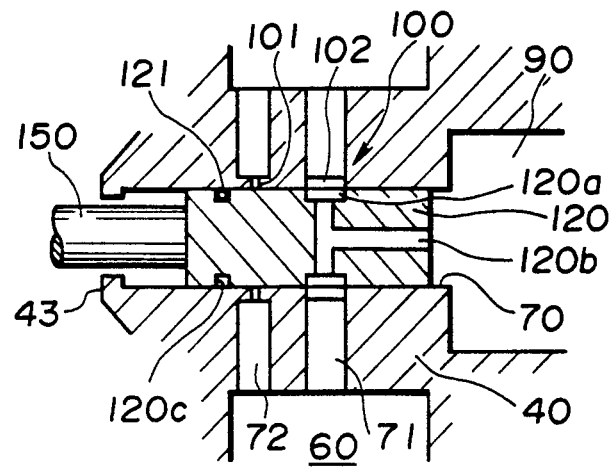
FIG. 1 is an enlarged view of a portion of FIG. 4 showing an operating position of the control coupling in which the variable orifice means is fully opened while the fixed orifice means is closed.
Figure 2:
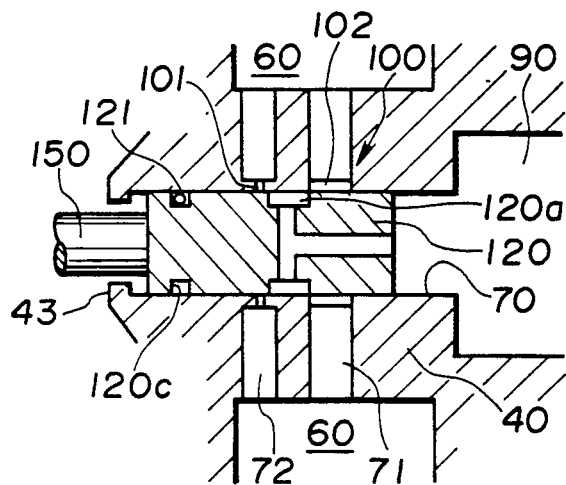
FIG. 2 is a view similar to FIG. 1 showing another operating position of the control coupling in which the variable orifice means is fully closed and the fixed orifice means is closed.
Figure 8:
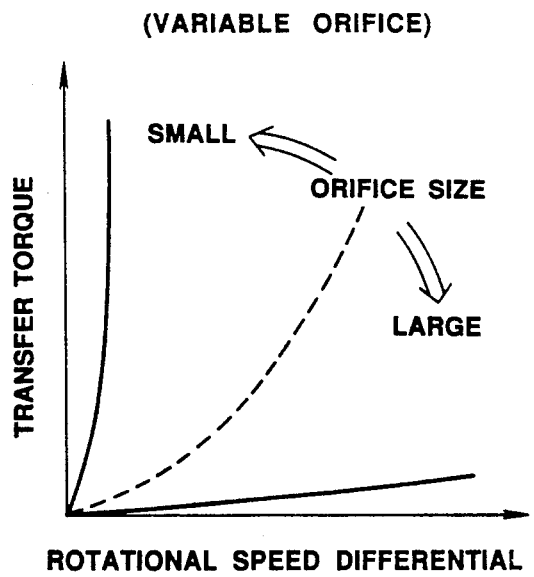
FIG. 8 is a graph depicting the variable torque transfer characteristic produced by the control coupling of FIG. 4 through variation of the size of the variable orifice means.

(A) In the event of the control circuit 200 functioning properly:

In the event of the control circuit 120 functioning properly, the stepping motor 180 drives the valve spool 120 by way of the lever 182 and the push rod 150 and in accordance with a signal from the control circuit 200 in such a manner as to cause the valve spool 120 to move between the position of FIG. 1 where the orifices 102 are fully opened and the position of FIG. 2 where the orifices 102 are fully closed. More specifically, when the valve spool 120 is in the position of FIG. 1, the circumferential groove 120a coincides with the orifices 102, thus causing the orifices 12 to be fully opened. When the valve spool 120 is in the position of FIG. 2, the orifices 102 are fully closed. When the valve spool 120 is positioned intermediate between the position of FIG. 1 and the position of FIG. 2, the opening or size of each orifice 102 varies in dependence upon the axial position of the valve spool 120. The control coupling 20 thus can produce various torque transfer characteristics through variations of the opening or size of the orifices 102 as shown in FIG. 8.

When, under this condition, a relative rotation between the cam ring 30 and the rotor 40 occurs, discharge of hydraulic fluid from the cylinder chambers 60 into the accumulator chamber 90 through the discharge passages 71 is restricted by the orifices 102 to such a degree as is proportional to the opening or size of the orifices 102. By this restriction of discharge, the hydraulic pressure within the cylinder chambers 60 is caused to rise, the pistons 50 are pressed against the cam surface 31 with such a force that is calculated by multiplying the hydraulic pressure within the cylinder chambers 60 by the surface area of the pistons 50 subjected to the hydraulic pressure, thus producing a transfer torque proportional to the relative rotation between the cam ring 30 and the rotor 40.

Figure 3:
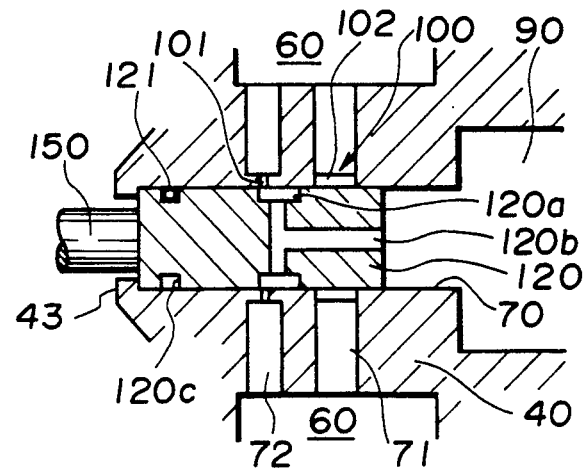
FIG. 3 is a view similar to FIG. 1 showing a further operating position of the control coupling in which the variable orifice means is fully closed while the fixed orifice means is opened.
Figure 9:
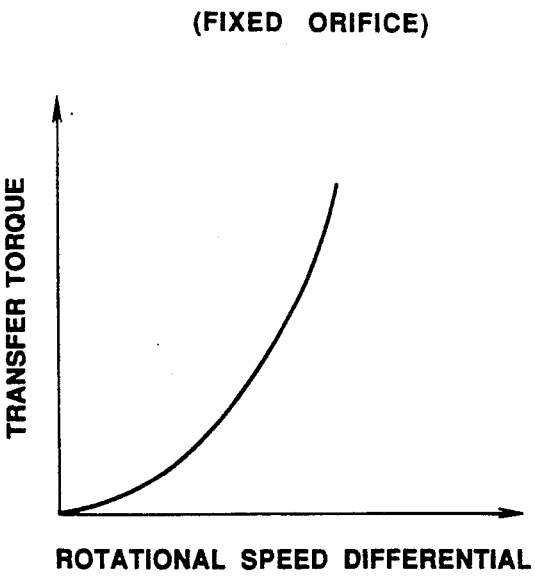
FIG. 9 is a graph depicting the torque transfer characteristic produced by the control coupling of FIG. 4 when the fixed orifice is opened while the variable orifice is fully closed.

(B) In the event of malfunction of the control circuit 200:

When the control circuit 200 fails to function properly due to breakage of wire, etc., the stepping motor 181 does not apply any drive to the push rod 150 but allows it to move freely such that the valve spool 120 is moved leftward under the pressure of the hydraulic fluid within the accumulator chamber 90 and caused to abut upon the stopper 43 to be held stationarily thereat. As shown in FIG. 3, with such a valve spool 120 held stationarily in abutment upon the stopper 43, an intermediate opening or size of the orifice means 100 is attained since the orifices 101 of a smaller size are opened while the orifices 102 of a larger size are fully closed. The control coupling 20 thus produces only one torque transfer characteristic which is determined by the opening or size of the orifices 101 as shown in FIG. 9.

When, under this condition, a relative rotation between the cam ring 30 and the rotor 40 occurs, discharge of hydraulic fluid from the cylinder chambers 60 into the accumulator chamber 90 through the discharge passages 71 is restricted by the orifices 101 to such a degree as is determined by the opening or size of the orifices 101. By this restriction of discharge, the hydraulic pressure within the cylinder chambers 60 is caused to rise, the pistons 50 are pressed against the cam surface 31 with the force calculated by multiplying the hydraulic pressure within the cylinder chambers 60 by the surface area of the pistons 50 subjected to the hydraulic pressure, thus producing a transfer torque (differential slip limiting torque) proportional to the relative rotation between the cam ring 30 and the rotor 40.

From the foregoing, it will be understood that an orifice means is adapted to cooperate with a valve spool to constitute a variable orifice means which becomes effective for attaining an optimal torque transfer characteristic in the vent of a control circuit functioning properly, and a fixed orifice means which becomes effective for attaining a suitable torque transfer characteristic in the even of malfunction of the control circuit such that in the event of the control circuit functioning properly it becomes possible to attain an optimal torque transfer characteristic in accordance with a vehicle running condition and thereby improve the driving ability and stability while in the event of malfunction of the control circuit a suitable torque transfer characteristic can be retained for thereby preventing an otherwise caused strange feel of a driver and thereby assuring the safety driving.

It is further to be understood that the top 53 of the piston 50 in contact with the cam surface 31 is formed with the oil grooves 53a except the apex portion such that the lubrication property and wear resistance can be improved without causing any influence on movement of the piston 50 when the piston 50 goes over the smallest diameter portion of the cam surface 31 and are positioned most inward of the rotor 40.

Figure 10:
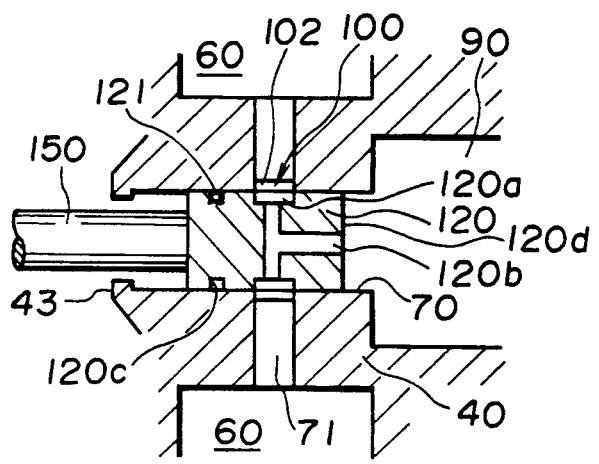
FIG. 10 is a view similar to FIG. 1 but shows an operating position of a rotational speed differential responsive type control coupling according to another embodiment of the present invention, in which the variable orifice means is fully opened.
Figure 11:
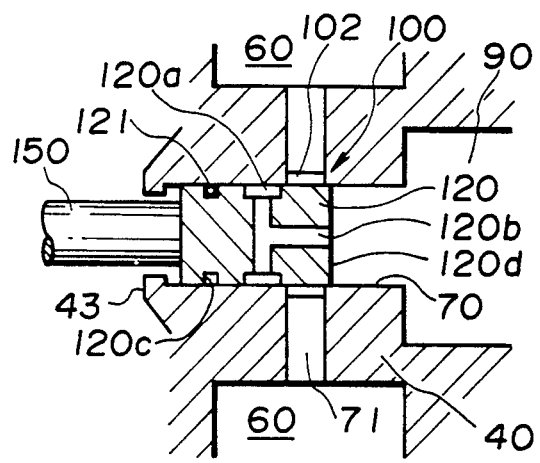
FIG. 11 is a view similar to FIG. 10 but shows another operating position of the control coupling in which the variable orifice means is fully closed.
Figure 12:
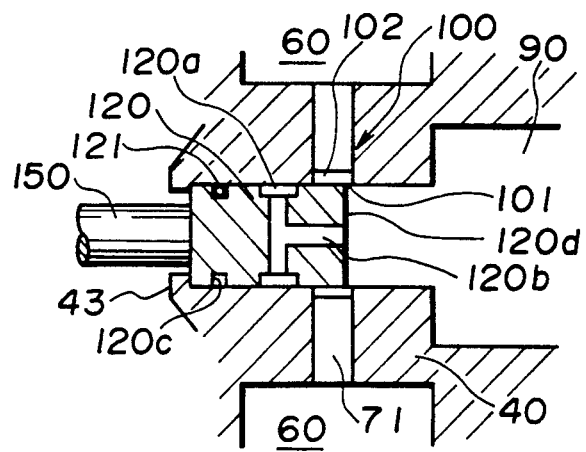
FIG. 12 is a view similar to FIG. 10 but shows a further operating position of the control coupling in which the variable orifice means is fixed in size and partly opened.

FIGS. 10 through 12 shows a further embodiment. In this embodiment, the discharge passage 71 and orifices 102 of a larger size cooperate with the valve spool 120 to constitute not only a variable orifice means but a fixed orifice means 101'.

In the event of the control circuit 200 functioning properly, the valve spool 120 moves between a position of FIG. 10 and a position of FIG. 11 under the control of the control circuit 120. In the position of FIG. 10, the valve spool 120 fully opens the orifices 102. In the position of FIG. 11, the valve spool 120 fully closes the orifices 102. The orifices 102 thus cooperates with the valve spool 120 to constitute a variable orifice means.

In the event of malfunction of the control circuit 200, the valve spool 120 is moved into the position of FIG. 12 under the pressure of the hydraulic fluid within the accumulator chamber 90. In the position of FIG. 12, the valve spool 120 is adapted to abut at one end upon the stopper 43 and at the other end partly opens the orifices 102. The orifices 102 thus cooperates with the valve spool 120 to constitute a fixed orifice means 101'.

The valve spool 120 is thus constructed and arranged to have such a length that when the valve spool 120 abuts at one axial end upon the stopper 43 it partly opens the orifices 102 at the other axial end for thereby defining the fixed orifice means 101'.

The orifices 102 are thus adapted to cooperate with the valve spool 120 to constitute not only a variable orifice means but a fixed orifice means.

Except for the above, this embodiment is substantially similar to the previous embodiment of FIGS. 1 through 9 and can produce substantially the same effect.

While the present invention has been described and shown as being applied to a limited slip differential to serve as a differential slip limiting device, this is not for the purpose of limitation but it may be used as a driving force distributing device for a four-wheel drive. Further, the motor 181 may be replaced by another kind of actuator such as a hydraulic motor.

What is claimed is:

1. A control coupling comprising:
   a first rotary member;
   a second rotary member;
   hydraulic fluid discharge means responsive to a rotational speed differential between said first and second rotary members for discharging a quantity of hydraulic fluid proportional to said rotational speed differential;
   orifice means for restricting discharge of hydraulic fluid by said discharge means and thereby producing a transfer torque between said first and second rotary members;
   orifice opening changing means operatively connected to said orifice means for changing an orifice size of said orifice means;
   said orifice opening changing means including a valve spool axially movable for varying an orifice size of said orifice means when actuated and actuator means for actuating said valve spool; and
   a control circuit for controlling an operation of said actuator means;
   said valve spool being movable between first and second axial positions in the event of said control circuit functioning properly and into a third axial position which is outside a range between the first and second positions to be held stationarily thereat in the event of malfunction of said control circuit;
   wherein said orifice means cooperates with said valve spool to constitute variable orifice means for varying the orifice size between a predetermined minimum value and a predetermined maximum value when said valve spool is between said first and second axial positions and a fixed orifice means for having an orifice size between said predetermined minimum value and said predetermined maximum value when said valve spool is in the third axial position.

2. The control coupling according to claim 1, further comprises accumulator chamber means into which said discharge means discharges said quantity of hydraulic fluid and stopper means abuttingly engageable with one axial end of said valve spool when said valve spool is moved into the third axial position, said valve spool being subjected at the other axial end to a hydraulic pressure in said accumulator chamber means and connected at said one axial end to said actuator means.

3. The control coupling according to claim 2, wherein said orifice means comprises a pair of orifices which are different in orifice size, and wherein a larger one of said orifices constitutes part of said variable orifice means and a smaller one constitutes said fixed orifice means.

4. The control coupling according to claim 3, wherein said valve spool has a circumferential groove in its circumferential surface and an opening for communicating said circumferential groove to said accumulator chamber, a width of said circumferential groove being slightly smaller than a distance between said pair of orifices with respect to an axial direction of said valve spool such that said circumferential groove is communicable with only said larger orifice when said valve spool is between the first and second axial positions and with only said smaller orifice when said valve spool is in the third axial position.

5. The control coupling according to claim 2, wherein said orifice means comprises an orifice which is partly opened by said other end of said valve spool to constitute said fixed orifice means when said valve spool is in the third axial position.

6. The control coupling according to claim 5, wherein said valve spool has a circumferential groove in its circumferential surface and an opening for communicating said circumferential groove to said accumulator chamber, said orifice being variably communicable with said circumferential groove in dependence upon a variation of the axial position of said valve spool to constitute said variable orifice means when said valve spool is between the first and second axial positions.

7. The control coupling according to claim 1, wherein said actuator comprises a stepping motor.

8. A control coupling comprising:
   a first rotary member;
   a second rotary member;
   hydraulic fluid discharge means installed on one of said first and second rotor members and responsive to a rotational speed differential between said first and second rotary members for discharging a quantity of hydraulic fluid proportional to said rotational speed differential;

orifice means for restricting discharge of hydraulic fluid by said discharge means and thereby producing a transfer torque between said first and second rotary members;

orifice opening changing means operatively connected to said orifice means for changing an orifice size of said orifice means;

said orifice opening changing means including a valve spool axially movable for varying an orifice size of said orifice means when actuated and actuator means for actuating said valve spool in accordance with a signal supplied thereto; and a control circuit for supplying said signal to said actuator means and thereby controlling the orifice size of said orifice means in such a manner that the orifice size of said orifice means is varied in response to a variation of a rotational speed differential between said first and second rotary members so as to attain a desired torque transfer characteristic;

said valve spool being movable between first and second axial positions in the event of said control circuit functioning properly and into a third axial position which is outside a range between the first and second position to be held stationarily thereat in the event of malfunction of said control circuit;

wherein said orifice means cooperates with said valve spool to constitute variable orifice means for varying the orifice size between a predetermined minimum value and a predetermined maximum value when said valve spool is between said first and second axial positions and a fixed orifice means for having an orifice size between said predetermined minimum value and said predetermined maximum value when said valve spool is in the third axial position.

9. A control coupling comprising:
a cam ring rotatable and formed with a cam surface;
a rotor installed in said cam ring for relative rotation thereto;
hydraulic fluid discharge means installed in said rotor and responsive to a rotational speed differential between said cam ring and said rotor for discharging a quantity of hydraulic fluid proportional to said rotational speed differential;
said hydraulic fluid discharge means including a plurality of pistons radially movably installed in said rotor and having part-spherical tops for contact with said cam surface;
orifice means installed in said rotor for restricting discharge of hydraulic fluid by said discharge means and thereby producing a transfer torque between said pistons and said cam surface;
orifice opening changing means operatively connected to said orifice means for changing an orifice size of said orifice means;
said orifice opening changing means including a valve spool axially movable for varying an orifice size of said orifice means when actuated and actuator means for actuating said valve spool; and
a control circuit for controlling an operation of said actuator means;
said valve spool being movable between first and second axial positions in the event of said control circuit functioning properly and into a third axial position which is outside a range between the first and second position to be held stationarily thereat in the event of malfunction of said control circuit;

wherein said orifice means cooperates with said valve spool to constitute a variable orifice means for varying the orifice size between a predetermined minimum value and a predetermined maximum value when said valve spool is between said first and second axial positions and a fixed orifice means for having an orifice size between said predetermined minimum value and said predetermined maximum value when said valve spool is in the third axial position.

10. The control coupling according to claim 9, wherein said tops of said pistons each have at a portion excluding an apex portion a plurality of grooves for lubrication thereof.

11. The control coupling according to claim 10, wherein said cam surface includes at an axially central portion thereof a groove for lubrication thereof.

12. A control coupling comprising:
a first rotary member;
a second rotary member;
hydraulic fluid discharge means responsive to a rotational speed differential between said first and second rotary members for discharging a quantity of hydraulic fluid proportional to said rotational speed differential;
orifice means for restricting discharge of hydraulic fluid by said discharge means and thereby producing a transfer torque between said first and second rotary members;
orifice opening changing means operatively connected to said orifice means for changing an orifice size of said orifice means;
said orifice opening changing means including a valve spool axially movable for varying an orifice size of said orifice means when actuated and actuator means for actuating said valve spool; and
control circuit means for controlling an operation of said actuator means;
said valve spool being movable between first and second axial positions in the event of said control circuit means functioning properly and into a third axial position which is outside a range between the first and second positions to be held stationarily thereat in the event of malfunction of said control circuit means;
in which said orifice means cooperates with said valve spool to constitute variable orifice means when said valve spool is between said first and second axial positions and fixed orifice means when said valve spool is in the third axial position,
further comprising accumulator chamber means into which said discharge means discharges said quantity of hydraulic fluid and stopper means abuttingly engageable with one axial end of said valve spool when said valve spool is moved into the third axial position, said valve spool being subjected at the other axial end to a hydraulic pressure in said accumulator chamber means and connected at said one axial end to said actuator means,
wherein said orifice means comprises a pair of orifices which are different in orifice size, and wherein a larger one of said orifices constitutes part of said variable orifice means and a smaller one constitutes said fixed orifice means.

13. The control coupling according to claim 12, wherein said valve spool has a circumferential groove in its circumferential surface and an opening for communicating said circumferential groove to said accumulator chamber, a width of said circumferential groove being slightly smaller than a distance between said pair of orifices with respect to an axial direction of said valve spool such that said circumferential groove is communicable with only said larger orifice when said valve spool is between the first and second axial positions and with only said smaller orifice when said valve spool is in the third axial position.

14. A control coupling comprising:
a first rotary member;
a second rotary member;
hydraulic fluid discharge means responsive to a rotational speed differential between said first and second rotary members for discharging a quantity of hydraulic fluid proportional to said rotational speed differential;
orifice means for restricting discharge of hydraulic fluid by said discharge means and thereby producing a transfer torque between said first and second rotary members;
orifice opening changing means operatively connected to said orifice means for changing an orifice size of said orifice means;
said orifice opening changing means including a valve spool axially movable for varying an orifice size of said orifice means when actuated and actuator means for actuating said valve spool; and
control circuit means for controlling an operation of said actuator means;
said valve spool being movable between first and second axial positions in the event of said control circuit means functioning properly and into a third axial position which is outside a range between the first and second positions to be held stationarily thereat in the event of malfunction of said control circuit means;
in which said orifice means cooperates with said valve spool to constitute variable orifice means when said valve spool is between said first and second axial positions and fixed orifice means when said valve spool is in the third axial position,
further comprising accumulator chamber means into which said discharge means discharges said quantity of hydraulic fluid and stopper means abuttingly engageable with one axial end of said valve spool when said valve spool is moved into the third axial position, said valve spool being subjected at the other axial end to a hydraulic pressure in said accumulator chamber means and connected at said one axial end to said actuator means,
wherein said orifice means comprises an orifice which is partly opened by said other end of said valve spool to constitute said fixed orifice means when said valve spool is in the third axial position,
wherein said valve spool has a circumferential groove in its circumferential surface and an opening for communicating said circumferential groove to said accumulator chamber, said orifice being variably communicable with said circumferential groove in dependence upon a variation of the axial position of said valve spool to constitute said variable orifice means when said valve spool is between the first and second axial positions.

* * * * *